US005607799A

United States Patent [19]

Moerner et al.

[11] Patent Number: 5,607,799
[45] Date of Patent: Mar. 4, 1997

[54] OPTICAL PHOTOREFRACTIVE ARTICLE

[75] Inventors: William E. Moerner, San Jose, Calif.; Scott M. Silence, Rochester, N.Y.; Robert J. Twieg, San Jose, Calif.

[73] Assignee: International Business Machines Corporation, Armonk, N.Y.

[21] Appl. No.: 230,987

[22] Filed: Apr. 21, 1994

[51] Int. Cl.⁶ .................................................. G03H 1/04
[52] U.S. Cl. .............................. 430/1; 430/2; 430/290; 359/1; 359/3; 385/5; 385/130; 385/141
[58] Field of Search ................................ 430/1, 2, 290; 359/1, 3; 385/5, 130, 131, 141

[56] References Cited

U.S. PATENT DOCUMENTS

| | | | |
|---|---|---|---|
| 4,338,387 | 7/1982 | Hewitt | 430/58 |
| 4,877,298 | 10/1989 | Teng et al. | 350/96.14 |
| 4,938,836 | 7/1990 | Carenco et al. | 156/605 |
| 4,999,809 | 3/1991 | Schildkraut et al. | 365/106 |
| 5,064,264 | 11/1991 | Ducharme et al. | 385/130 |
| 5,153,680 | 10/1992 | Naito et al. | 357/8 |
| 5,361,148 | 11/1994 | Bjorklund et al. | 359/3 |

OTHER PUBLICATIONS

S. Silence, W. E. Moerner, C. P. Walsh, J. S. Campbell, T. J. Matray, R. J. Twieg, (IBM Almaden Res. Ctr., Nonlinear Optical Properties of Photorefractive Polymers, Presented at SPIE Conference Jan. 21, 1993.

L. Li et al., "Photoconductivity in a Photocrosslinkable Second–Order Nonlinear Optical Polymer", Applied Physics B, vol. 53, 1991, pp. 279–281.

M. J. Sansone et al., "Observation of the Photorefractive Effect in a Dialkylaminonitrostilbene Copolymer", Optics Letters, vol. 18, No. 17, Sep. 1, 1993, pp. 1400–1402.

*Primary Examiner*—Martin J. Angebranndt
*Attorney, Agent, or Firm*—Robert B. Martin

[57] ABSTRACT

The present invention relates to a three-component optical photorefractive article having improved diffraction efficiency. The article comprises (i) nonphotoconductive polymer, (ii) benzimidazoline, and (iii) a sensitizer.

16 Claims, No Drawings

OPTICAL PHOTOREFRACTIVE ARTICLE

FIELD OF THE INVENTION

The present invention relates to an optical photorefractive article having an improved diffraction efficiency and increased storage lifetime.

BACKGROUND OF THE INVENTION

The photorefractive effect involves light-induced charge redistribution in a nonlinear optical material to produce internal electric fields which, by virtue of the optical nonlinearity, produce local changes in the index of refraction such that dynamic, erasable holograms are formed which diffract light. The photorefractive effect is achieved by exposing the material to an optical intensity pattern consisting of bright and dark regions, such as formed by interfering two coherent laser writing beams of the same polarization. Mobile charge generated in the material migrates to form internal space charge electric fields which create refractive index variations due to the electrooptic effect. These variations in refractive index in the photorefractive material are known as index gratings. The index gratings diffract light and are useful for a variety of applications, including storage of holographic images, diffractive optical elements, and photorefractive two-beam coupling.

Inorganic crystals exhibiting the photorefractive effect are well known in the art as described in Gunter and Huignard, "Photorefractive Materials and Their Applications", Vols. I and II ("Topics in Applied Physics", Vols. 61 and 62) (Springer, Berlin, Heidelberg, 1988). Inorganic photorefractive crystals have been fabricated into optical articles for the transmission and control (change in phase, intensity, or direction of propagation) of electromagnetic radiation, as well as for holographic image and data storage.

However, it is technically difficult to fabricate such crystals into desired large area samples or thin-layered devices such as optical wave guides or multiple layer stacks. Further, it is difficult to dope crystalline material with large concentrations of dopants in order to achieve desired property improvements, such as increase in the speed and/or magnitude of the photorefractive effect, because dopants are often excluded from the crystals during growth.

Certain polymeric photorefractive materials have been described by Ducharme et al., U.S. Pat. No. 5,064,264, and Schildkraut et al., U.S. Pat. No. 4,999,809. These polymeric materials can be fabricated into thin-layered devices such as optical wave guides and multilayer stacks. Further, they can be readily doped with materials to improve a photorefractive effect.

Schildkraut describes a photorefractive device having a layer of material comprising a sensitizer, a charge transporting layer, a binder, and an organic molecular dipole, which has been poled in an electric field at elevated temperatures so that the alignment of the molecular dipoles remains for long times at ambient temperatures. Although the material is shown to have light-induced changes in measured properties, Schildkraut does not show the formation of a photorefractive grating to demonstrate a photorefractive device.

Ducharme et al. describe photorefractive materials comprising a polymer, a nonlinear optical chromophore, a charge transport agent, and optionally a charge generator. The charge transport agent can be dispersed in the polymer binder or alternatively covalently bonded to or incorporated in the polymer backbone to form a photoconductive polymer. To achieve superior mechanical, optical, and ease-of-fabrication properties, it is desired to utilize polymers such as polymethacrylate, polystyrene, polycarbonate or the like which are unfortunately nonphotoconductive. The addition of a charge transport agent to suitable nonphotoconductive polymer to provide the requisite photoconductivity can diminish desired properties such a glass transition temperature and also, in particular, the nonlinearity and thereby reduce the diffraction efficiency of the article.

Although Ducharme's materials are useful in certain applications, there still is a desire in the industry for a photorefractive article having a higher diffraction efficiency in combination with good mechanical, optical, and ease-of-fabrication properties.

It is therefore an object of the present invention to provide an improved photorefractive article. Other objects and advantages will be apparent from the following disclosure.

SUMMARY OF THE INVENTION

The present invention relates to a two-component photorefractive article for the transmission of radiation comprising: (a) about 40 to 70 weight % of a nonphotoconductive polymeric binder, and (b) about 30 to 60 weight % of benzimidazoline having an electron withdrawing substituent on the benzene ring and optionally other substituents on the benzimidazoline. The benzimidazoline functions as a nonlinear optical chromophore to provide nonlinearity to the article and also surprisingly functions to transport a sufficient amount of charge in the article to achieve a large photorefractive effect without the addition of a separate charge transporting agent. The benzimidazoline enables the use of binder polymers which have good mechanical, optical, and ease-of-fabrication properties but are nonphotoconductive. Because the benzimidazoline functions to provide both nonlinearity and charge transportation, no separate charge transporting agent is needed, and therefore a large weight percent of the article can comprise the benzimidazoline to provide the article with high nonlinearity and diffraction efficiency. Preferably, the article also comprises a sensitizer. The benzimidazoline can be dispersed in the polymeric binder as guest/host or bonded to the polymeric binder.

The present invention also relates to a process for photorefractive index grating formation using the article and to a holographic storage device.

A more thorough disclosure of the present invention is presented in the detailed description which follows.

DETAILED DESCRIPTION OF THE INVENTION

The present invention relates to a three-component photorefractive article for the transmission of electromagnetic radiation comprising:

(i) about 40 to 60 weight % of benzimidazoline having an electron acceptor substituent on the benzene ring and optionally other substituents, (ii) about 2 weight % of a sensitizer, and (iii) the remainder of a nonphotoconductive polymeric binder.

The key feature of the present invention is the benzimidazoline which functions to provide the requisite nonlinearity to the article for photorefractivity, and also surprisingly provides the requisite photoconductivity to the article for large photorefractive effect.

The first component of the optical article of the present invention is the polymeric binder. Because both photoconductivity and nonlinearity are provided by the benzimidazoline component, the polymer needs only to provide good mechanical, optical, and ease-of-fabrication properties.

It is also desired that the benzimidazoline be readily soluble in the polymer and that the polymer have good rheological properties for ease of fabrication. The polymer can be a copolymer, homopolymer, or polymer blend. The polymer is nonphotoconductive having insufficient photoconductivity to enable photorefractivity such as bulk photoconductivity less than about $10^{-15}$ inverse ohm-cm per watt per square cm. Suitable nonphotoconductive polymers for the polymeric binder include polystyrene, polymethacrylate (polymethylmethacrylate), polyacrylate, polycarbonate, poly(vinylbutyral), or polyimide. The preferred nonphotoconductive polymer is polymethylmethacrylate. The polymers for the polymeric binder suitably have a molecular weight (Mn) of about 10,000 to about 1,000,000, preferably about 50,000 to about 500,000.

It is desired that the polymer have a glass transition temperature (Tg) above room temperature (e.g., Tg>25° C.). Optionally, the polymeric article can be crosslinked and permanently poled.

Such crosslinked polymers are conveniently made by placing in an electric field the benzimidazoline, a sensitizer, and an oligomer having the desired reactive functionalities. The oligomer is heated or exposed to light in the electric field to cause crosslinking of the oligomer. The polar order of the polymer is established in the field and after the polymer has been crosslinked, the polar order of the polymer is locked into place.

The second component of the optical article of the present invention is the benzimidazoline having an electron acceptor substituent on the benzene ring and optionally substituted with other substituents on the molecule. Suitable benzimidazoline has the following structure

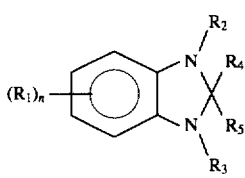

wherein $R_1$ is —$NO_2$,—CN,—CHC(CN)$_2$, —COR,—CO$_2$R or —SO$_2$R; n is 1 or 2; R, $R_2$ and $R_3$ are independently phenyl or alkyl, preferably lower alkyl ($C_1$–$C_5$), preferably methyl and $R_4$ and $R_5$ are independently alkyl or phenyl, preferably lower alkyl ($C_{1-4}$) or together $R_4$ and $R_5$ are cycloalkyl, preferably $C_4$–$C_6$ cycloalkyl.

Preferred benzimidazolines are (i) 1,3-dimethyl-2,2-tetramethylene-5-nitrobenzimidazoline (DTNBI), (ii) 1,3-dimethyl-2,2-pentamethylene-5-nitrobenzimidazoline (DHNBI), (iii) 1,3-dimethyl-2,2-(2-methyltetraamethylene)-5-nitro benzimidazoline (MDTNBI), and (iv) 1,3-dimethyl-2,2-dimethyl-5-nitrobenzimidazoline (DDNBI). The benzimidazoline can also be substituted by other substituents which do not unacceptably interfere with the nonlinearity and charge transporting ability of the molecule such as alcohol, acid, haloalkyl, keto, alkoxy, or amine substituents which are bonded to the benzimidazoline through aryl or alkylene bridges having two or more carbon atoms. These compounds are contemplated as equivalent of those claimed herein. The benzimidazoline of the present invention is synthesized by standard procedures conveniently by reacting a substituted orthophenylene diamine with a ketone with an acid catalyst.

Preferably, the optical article also comprises a minor amount of a sensitizer. Preferably, the article comprises about 0.1 to about 5 weight % of the sensitizer, more preferably about 2 weight % (e.g., 0.1 to 4 weight %). The formation of the spatially varying internal electric field requires the generation of a mobile charge as a result of the action of the two interfering coherent light beams of the same polarization. The generation of a mobile charge may be accomplished in some cases by light absorption in the benzimidazoline. However, the optical article is preferably doped with a minor amount of a sensitizer to generate charge upon exposure to electromagnetic radiation. Suitable sensitizers for use in the process of the present invention include tri-nitrofluorenone (TNF), fullerenes such as $C_{60}$ and $C_{70}$, perylene dyes such as perylene dicarboxyimide, thiapyrylium dyes, squarylium dyes, and charge transfer complexes such as anthracene/tetracyanoquinodimethane. Other sensitizing agents will be known in the art such as those disclosed in U.S. Pat. No. 5,064,264, the disclosure of which is incorporated herein by reference.

Preferably, the article comprises about 40 weight % of the benzimidazoline, and more preferably about 50 weight % of the benzimidazoline, and most preferably about 60 weight % of the benzimidazoline.

Suitable three-component articles consist essentially of about 2 weight % of a sensitizer and about x weight % of nonphotoconductive polymer and benzimidazoline as follows:

| Nonphotoconductive | Benzimidazoline |
| --- | --- |
| 58 | 40 |
| 53 | 45 |
| 48 | 50 |
| 42 | 55 |
| 38 | 60 |

Optionally, the optical article of the present invention can be doped with minor amounts (e.g., less than about 3 to 5 weight %) of a variety of other components known to those skilled in the art. Such components include charge-trapping agents or agents to improve the glass transition temperature.

In the first step of the process of the present invention for forming a photorefractive index grating, the polymeric optical article is preferably exposed to electromagnetic radiation to activate the article. The article is exposed to electromagnetic radiation, preferably at a wavelength of about 500 to 2000 nm. Suitable radiation sources include mercury or xenon lamps, a krypton or argon laser, a diode laser, titanium sapphire laser, a dye laser, or the like. Preferred radiation sources include krypton, argon, or diode laser. Generally, the article is exposed to electromagnetic radiation having an intensity of at least about 0.05 W/cm$^2$, preferably at least about 0.1 W/cm$^2$, more preferably at least about 1.0 W/cm$^2$, and most preferably at least about 10 W/cm$^2$. Preferably, the polymer has a high absorption coefficient for the incident radiation in this first step. The article is exposed to electromagnetic radiation for a period of time of about 15 minutes, preferably at least 30 minutes, and more preferably at least about 60 minutes. During the first step, the article absorbs an energy/unit volume of at least about $1\times10^3$ J/cm$^3$, more preferably at least about $10^5$ J/cm$^3$, and more preferably at least about $1\times10^6$ J/cm$^3$. The exposure of the polymeric article to electromagnetic radiation prior to forming the index grating in the article surprisingly results in substantially increasing the diffraction efficiency of the optical article and also substantially decreasing the decay rate of the diffraction efficiency of the optical article.

In this first step of the process of the present invention, the entire article may be flood exposed to electromagnetic radiation or, alternatively, the article can be pattern exposed to electromagnetic radiation to obtain spatial intensity variations. Such patterning can result in spatially-modulated enhancement of the diffraction efficiency such as a series of rectangular regions or a zone plate. In the first step of the process of the present invention, the article is preferably biased in an electric field. The method of establishing an electric field is well known in the art, for example, by locating the optical article between two transparent plates each coated with a transparent conducting material such as indium tin oxide. Suitable field values for the external field are about 0 V/μm to 500 V/μm, preferably about 50 V/μm.

In the second step of the process of the present invention for forming a photorefractive index grating, the optical article is again exposed to an external electric field. Suitable field values for the external field are about 0.1 V/μm to 500 V/μm. Two coherent light beams of the same polarization having the same wavelength are then overlapped in the optical article. Preferred sources of coherent light beams are lasers and other light sources of high temporal and spatial coherence. Preferred lasers are krypton ion, argon ion, titanium sapphire, dye, diode, and neodymium yttrium aluminum garnet lasers. The light conveniently has a wavelength between 500 and 2000 nm. The two incident beams are suitably focused so that they intersect within the optical article; that is, both beams overlap over a distance short compared to the coherence length and the illuminated volume of the optical article is substantially composed of the overlap region. Preferably, the polymer has a low absorption coefficient for the two incident beams. As a result of the coherence requirement, the overlap region contains an optical interference pattern as a photorefractive index grating which is a pattern of bright and dark light fringes. In the case that the two beams have a uniform optical intensity, the fringe pattern has a sinusoidal dependence on distance, with a well-defined spatial wavelength and spatial frequency, defined as the number of peaks or valleys per unit length.

The photorefractive optical article can be freestanding or alternatively can be disposed in a waveguide, fiber, or multilayer stack. The methods for making such optical articles, establishing the external electric field, and overlapping the coherent laser beams in the article are disclosed in Gunter and Huignard (ref. above); waveguide—Herminghaus et al., JOSA B 8, 2311 (1991); fibers—Hesselink et al., Opt. Lett. 13, 877 (1988); and photopolymer stack—Nordin et al., Opt. Lett. 17, 1709 (1992), which are each incorporated herein by reference.

Photorefractive optical articles have a further useful property, two-beam coupling, where the two coherent beams intersecting in the material exchange power. The two-beam coupling is asymmetric in that one beam gains power as the other loses power. The resulting power transfer from one beam to the other is characterized by a gain coefficient $\Gamma$ as described in Huignard and Marvakachi, Opt. Commun. 38, 249 (1981), the disclosure of which is incorporated herein by reference.

The article of the present invention produces diffraction efficiencies for 125 μm thickness of greater than $1\times10^{-3}$, preferably greater than $1\times10^{-2}$. The article also produce index of refraction grating amplitudes greater than $5\times10^{-5}$, preferably greater than $2\times10^{-4}$. The article also surprisingly has decreased decay rate of diffraction efficiency, which provides for increase in data storage lifetime, enhancing its utility for storage of information.

The article of the present invention can be utilized in a variety of applications such as optical phase conjugation, optical beam deflection, holographic optical data and image storage, optical interconnection, coherent optical amplification, optical limiting, beam fanning, and self-phase conjugation.

The present invention also relates to a holographic storage device. (See R. J. Collier et al., Optical Holography, Ch. 16, Academic Press (1991)) The process for holographic storage generally involves exposing the photorefractive optical article to an external electric field and to two intersecting coherent writing beams of the same polarization. Suitably, one of the two beams is a noninformation-bearing reference beam, preferably a collimated or weakly focused beam with nearly planar phase fronts. The second beam is generally the information-bearing signal beam, which in general has a complicated phase front and has a complicated transverse intensity distribution. Information in the form of parallel blocks of data is impressed on the signal beam by passing it through a mask or page composer that modulates its transverse phase or intensity profile. The photorefractive optical article records the hologram as a complicated three-dimensional spatial pattern of index of refraction variation, which is mathematically equivalent to the Fourier superposition of a multiplicity of sinusoidal index gratings, each with a distinct amplitude and spatial frequency and phase. After an appropriate strength of the overall index of refraction variation is reached, the reference and signal beams are shut off.

The information recorded in the hologram can be read out by illuminating the photorefractive optical article with a duplicate of the original reference beam. The index of refraction variations produced by the writing process diffract light from the readout beam to form a reconstruction of the original information bearing signal beam which originates within the photorefractive optical article and propagates through free space beyond the article. The holographically recorded data is then recovered by using standard optical elements to capture the reconstructed beam and form a real image of the plane of the page composer on a high-resolution detector array.

Surprisingly, if the article of the present invention is read with a low intensity reference beam (e.g., less than about $10^{-4}$ W/cm$^2$), there is minimal loss of data in the article caused by destructive reading.

When the photorefractive article is thick compared to the inverse of the dominant spatial frequency component of the recorded hologram, multiple holograms can be multiplexed in the same spot on the photorefractive article by varying the angle of incidence of the reference beam so that each hologram is produced by a separate angle of intersection of reference and signal beams during the writing process. Selected holograms are then read out by illuminating the same spot on the photorefractive article with readout beams that duplicate the particular reference beam used in the recording process, including the same angle of incidence. (As described by D. L. Staebler et al., Appl. Phys. Lett. 26, 182 (1975)) Alternatively, multiplexing can be achieved by encoding the phase fronts of each reference beam (as described by C. Denz et al., Optics Communications 85, 171–176 (1991)) or by varying the laser wavelength used to form the reference, signal, and readout beams.

The present invention also relates to a holographic storage device comprising:

(1) a three-component photorefractive polymeric optical article comprising (i) about 40 to 60 weight % of benzimidazoline having an electron acceptor substituent on the benzene ring and optionally other substituents, (ii) about 2 weight % of a sensitizer, and (iii) the remainder of a nonphotoconductive polymeric binder;

(2) means for intersecting two beams of coherent electromagnetic radiation of the same polarization (the reference and signal beams) in the article;

(3) means for applying an external electric field; and (4) means for impressing spatial information on the signal beam.

Preferably, the device is provided with means for controlling the reference beam's phase and/or angle. The operational parameters for holographic process storage and components for holographic storage devices are well known in the art for crystalline photorefractive material such as disclosed in the Collier et al. reference above, the disclosure of which is incorporated herein by reference. The present invention also relates to a diffractive optical element process and device which are similar to the storage process and device, except that (4) is replaced with means for impressing desired radii of curvature on one or both beams.

The following examples are detailed descriptions of the process of the present invention. The detailed preparations fall within the scope of, and serve to exemplify, the more generally described methods set forth above. The examples are presented for illustrative purposes only, and are not intended as a restriction on the scope of the invention.

EXAMPLE 1

Synthesis of 1,3-dimethyl-2,2-tetramethylene-5-nitrobenzimidazoline (DTNBI). In a 250 mL round bottom flask was placed 3,4-bis(methylamino)nitrobenzene (0.90 g, 5.0 mmol), ethyl acetate (125 mL), cyclopentanone (2.10 g, 25,0 mmol), and toluenesulfonic acid hydrate (25 mg). The resulting solution was boiled on a steam bath for one hour and then silica gel (10 g) was added and the slurry concentrated to dryness. This mixture was placed at the top of a silica gel column and eluded with a gradient of ethyl acetate in hexane. Fractions containing pure product were combined and concentrated and recrystallized from a mixture of isopropyl ether and dichloromethane to give black glistening needles (1.09 g, 87%): mp 104.8–107.7; $^1$H NMR (CDCL$_3$) δ 7.66 (dd, J=2 Hz, 8 Hz, 1H), 6.80 (d, 2 Hz, 1H), 5.95 (d, 8 Hz, 1H), 2.88 (s, 3H), 2.81 (s, 3H), 1.90–2.05 (m, 4H), 1.66–1.89 (m, 4H); $^{13}$C NMR (CDCL$_3$) ppm 140.016, 139.997, 138.779, 118.792, 98.654, 97.471, 95.557, 34.132, 27.954, 27.811, 26.063.

EXAMPLE 2

To 0.25 ml of the solvent toluene was added 38 mg of the inert binder polymer polymethylmethacrylate (PMMA), 19 mg of the chromophore DTNBI, and 0.1 mg of the sensitizer $C_{60}$. The solution was deposited on two glass plates coated with 120 nm of the transparent conducting material indium tin oxide (ITO). The polymer mixture was dried under ambient conditions for 16 hours and at 50° C. at a pressure of <0.1 atm. for an additional 6 hours. The coated plates were then heated at 140° C. for 2 minutes and the plates were pressed together to seal the polymer mixture between them. The plates were held parallel by means of 125 μm mylar spacers placed at the edges of the plates.

Photoconductivity was demonstrated by placing 500 V bias across the sample and measuring the increase in the current when the sample was irradiated with 100 mW of monochromatic 676 nm light with a spot size of 3 mm. From this, the photoconductivity per unit light intensity σ/I was determined to be $8 \times 10^{-14}$ $(\Omega cm)^{-1}/(W/cm^2)$.

The photorefractive properties are characterized by the holographic optical techniques of four-wave mixing (FWM) and two-beam coupling (2BC). In either technique, two continuous wave writing beams (λ=676 nm, 6 mW power, 750 μm spot diameter) from a krypton laser are overlapped in the sample using an external angle of 30 degrees. The sample is tilted 45 degrees from the bisector of the write beams in order to provide a projection of the grating wavevector along the direction of the applied electric field ($E_0$=40 V/μm unless otherwise noted). In the FWM experiments, the writing beams are s-polarized and the grating is read out with a p-polarized reading beam (676 nm, 75 μm spot diameter) counterpropagating to one of the writing beams. The diffraction efficiency η is defined as the power of the diffracted beam exiting the sample, divided by the power of the reading beam incident on the sample. In the 2BC experiments, the intensities of the p-polarized writing beams exiting the sample are monitored directly.

The photorefractive effect was demonstrated by means of the degenerate FWM and 2BC techniques. The operating wavelength in both measurements was 676 nm. When a bias field of 5000 V is placed across the sample, a peak diffraction efficiency of $\eta=1.9 \times 10^{-3}$ was observed in the FWM measurement. At the same field, the 2BC was observed to be asymmetric with a gain coefficient of $\Gamma=7.7$ cm$^{-1}$.

EXAMPLE 3

The same sample in which the photorefractive effect was demonstrated in Example 2 was uniformly irradiated with an absorbed energy/unit volume of $4 \times 10^5$ J/cm$^3$ (λ=647 nm, 50 mW power, 750 μm spot size, α=10 cm$^{-1}$, and 60 minutes irradiation time). The photorefractive effect was then demonstrated again in this sample by means of the degenerate FWM and 2BC techniques discussed above. The operating wavelength in both measurements was 676 nm. When a bias field of 5000 V was placed across the sample, a peak diffraction efficiency of $\eta=3.5 \times 10^{-3}$ was observed in the FWM measurement. At the same field, the 2BC was observed to be asymmetric with a gain coefficient of $\Gamma=10$ cm$^{-1}$.

EXAMPLE 4

The same sample in which the photorefractive effect was demonstrated in Example 3 was uniformly irradiated further with an additional absorbed energy/unit volume of $4 \times 10^6$ J/cm$^2$ (λ=647 nm). The photorefractive effect was then demonstrated again in this sample by means of the degenerate FWM and 2BC techniques discussed above. The operating wavelength in both measurements was 676 nm. When a bias field of 5000 V was placed across the sample, a peak diffraction efficiency of $\eta=2.3 \times 10^{-2}$ was observed in the FWM measurement. At the same field, the 2BC was observed to be asymmetric with a gain coefficient of $\Gamma=24$ cm$^{-1}$. The holographic storage lifetime of the sample, characterized by the time necessary for the diffraction efficiency to decay to 10% of the initial value, is measured to be 1.1 hours at a reading intensity of $1.5 \times 10^{-2}$ W/cm$^2$ and estimated to be >250 hours at a reading intensity of $2 \times 10^{-5}$ W/cm$^2$.

EXAMPLE 5

To 0.25 ml of the solvent toluene was added 23 mg of the inert binder polymer PMMA, 34 mg of the chromophore DTNBI, and 0.1 mg of the sensitizer $C_{60}$. A sample was prepared from this solution as described in Example 2. The sample was uniformly irradiated as described in Example 2 prior to observation of the PR effect.

The photorefractive effect was demonstrated by means of the degenerate FWM and 2BC techniques discussed above. The operating wavelength in both measurements was 676 nm. When a bias field of 5000 V was placed across the sample, a peak diffraction efficiency of $\eta=3.5\times10^{-2}$ was observed in the FWM measurement. At the same field, the 2BC was observed to be asymmetric with a gain coefficient of $\Gamma=54$ cm$^{-1}$.

EXAMPLE 6

To 0.25 ml of the solvent toluene was added 38 mg of the inert binder polymer PMMA, 19 mg of the chromophore DDNBI, and 0.1 mg of the sensitizer $C_{60}$. A sample was prepared from this solution as described in Example 2.

The photorefractive effect was demonstrated by means of the degenerate FWM and 2BC techniques discussed above. The operating wavelength in both measurements was 676 nm. When a bias field of 5000 V was placed across the sample, a peak diffraction efficiency of $\eta=1.4\times10^{-3}$ was observed in the FWM measurement. At the same field, the 2BC was observed to be asymmetric with a gain coefficient of $\Gamma=16$ cm$^{-1}$.

EXAMPLE 7

To 0.25 ml of the solvent toluene was added 38 mg of the inert binder polymer PMMA, 19 mg of the chromophore DHNBI, and 0.1 mg of the sensitizer $C_{60}$. A sample was prepared from this solution as described in Example 2.

The photorefractive effect was demonstrated by means of the degenerate FWM and 2BC techniques discussed above. The operating wavelength in both measurements was 676 nm. When a bias field of 5000 V was placed across the sample, a peak diffraction efficiency of $\eta=3.2\times10^{-3}$ was observed in the FWM measurement. At the same field, the 2BC was observed to be asymmetric with a gain coefficient of $\Gamma=3.5$ cm$^{-1}$.

Although this invention has been described with respect to specific embodiments, the details thereof are not to be construed as limitations for it will be apparent that various embodiments, changes, and modifications may be resorted to without departing from the spirit and scope thereof, and it is understood that such equivalent embodiments are intended to be included within the scope of this invention.

We claim:

1. A three-component photorefractive article for the transmission of electromagnetic radiation consisting essentially of (i) about 2 weight % of a sensitizer, (ii) about 38 weight % of a compound having the structure:

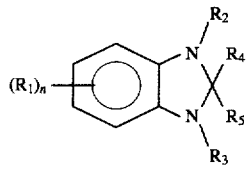

wherein $R_1$ is —$NO_2$, —CN, —CHC(CN)$_2$, —COR, —$CO_2$R or —$SO_2$R; n is 1 or 2; R, $R_2$ and $R_3$ are independently phenyl or alkyl, and $R_4$ and $R_5$ are independently alkyl or together $R_4$ and $R_5$ are cycloalkyl, which functions as a non linear optical chromophore and a charge transfer agent, and (iii) 60 weight % nonphotoconductive polymer.

2. The article of claim 1 wherein said compound is (i) 1,3-dimethyl-2,2-tetramethylene-5-nitrobenzimidazoline, (ii) 1,3-dimethyl-2,2-pentamethylene-5-nitrobenzimidazoline, or (iii) 1,3-dimethyl-2,2-dimethyl-5-nitrobenzimidazoline.

3. The article of claim 2 wherein the polymer is polymethacrylate.

4. The article of claim 2 where the sensitizer is fullerene, thiapyrylium dyes, or trinitrofluorenone.

5. A holographic storage device comprising:

(a) a three-component photorefractive article for the transmission of electromagnetic radiation consisting essentially of (i) about 2 weight % of a sensitizer, (ii) about 38 weight % of a compound having the structure:

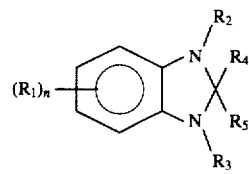

wherein $R_1$ is —$NO_2$, —CN, —CHC(CN)$_2$, —COR, —$CO_2$R or —$SO_2$R; n is 1 or 2; R, $R_2$ and $R_3$ are independently phenyl or alkyl, $R_4$ and $R_5$ are independently alkyl or together $R_4$ and $R_5$ are cycloalkyl, which functions as a non linear optical chromophore and a charge transfer agent, and (iii) 60 weight % nonphotoconductive polymer;

(b) means for applying an external electric field to the article;

(c) means for forming two intersecting beams of coherent electromagnetic radiation in the article; and (d) means for impressing spatial information on one of the beams of radiation.

6. The device of claim 5 wherein said compound is (i) 1,3-dimethyl-2,2-tetramethylene-5-nitrobenzimidazoline, (ii) 1,3-dimethyl-2,2-pentamethylene-5-nitrobenzimidazoline, or (iii) 1,3-dimethyl-2,2-dimethyl-5-nitrobenzimidazoline.

7. The device of claim 5 wherein the polymer is polymethacrylate.

8. The device of claim 5 wherein the sensitizer is selected from fullerene, thiapyrylium dyes, or trinitrofluorenone.

9. A three-component photorefractive article for the transmission of electromagnetic radiation consisting essentially of (I) about 2 weight % of a sensitizer, (ii) about 55 weight % of a compound having the structure:

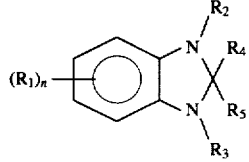

wherein $R_1$ is —$NO_2$, —CN, —CHC(CN)$_2$, —COR, —$CO_2$R or —$SO_2$R; n is 1 or 2; R, $R_2$ and $R_3$ are independently phenyl or alkyl, and $R_4$ and $R_5$ are independently alkyl or together $R_4$ and $R_5$ are cycloalkyl, which functions as a non linear optical chromophore and a charge transfer agent, and (iii) about 43 weight % of nonphotoconductive polymer.

10. A three-component photorefractive article for the transmission of electromagnetic radiation consisting essentially of (I) about 2 weight % of a sensitizer, (ii) about 50 weight % of a compound having the structure:

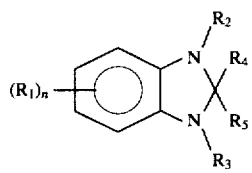

wherein $R_1$ is —$NO_2$, —CN, —$CHC(CN)_2$, —COR, —$CO_2R$ or —$SO_2R$; n is 1 or 2; R, $R_2$ and $R_3$ are independently phenyl or alkyl, and $R_4$ and $R_5$ are independently alkyl or together $R_4$ and $R_5$ are cycloalkyl, which functions as a non linear optical chromophore and a charge transfer agent, and (iii) about 48 weight % of nonphotoconductive polymer.

11. A three-component photorefractive article for the transmission of electromagnetic radiation consisting essentially of (I) about 2 weight % of a sensitizer, (ii) about 45 weight % of a compound having the structure:

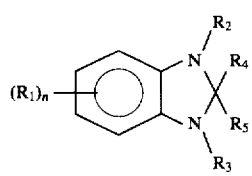

wherein $R_1$ is —$NO_2$, —CN, —$CHC(CN)_2$, —COR, —$CO_2R$ or —$SO_2R$; n is 1 or 2; R, $R_2$ and $R_3$ are independently phenyl or alkyl, and $R_4$ and $R_5$ are independently alkyl or together $R_4$ and $R_5$ are cycloalkyl, which functions as a non linear optical chromophore and a charge transfer agent, and (iii) about 53 weight % of nonphotoconductive polymer.

12. A three-component photorefractive article for the transmission of electromagnetic radiation consisting essentially of (I) about 2 weight % of a sensitizer, (ii) about 40 weight % of a compound having the structure:

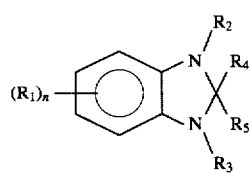

wherein $R_1$ is —$NO_2$, —CN, —$CHC(CN)_2$, —COR, —$CO_2R$ or —$SO_2R$; n is 1 or 2; R, $R_2$ and $R_3$ are independently phenyl or alkyl, and $R_4$ and $R_5$ are independently alkyl or together $R_4$ and $R_5$ are cycloalkyl, which functions as a non linear optical chromophore and a charge transfer agent, and (iii) about 58 weight % of nonphotoconductive polymer.

13. A holographic storage device comprising:
(a) a three-component photorefractive article for the transmission of electromagnetic radiation consisting essentially of (I) about 2 weight % of a sensitizer, (ii) about 55 weight % of a compound having the structure:

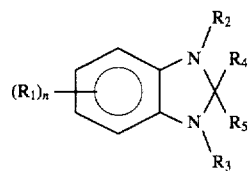

wherein $R_1$ is —$NO_2$, —CN, —$CHC(CN)_2$, —COR, —$CO_2R$ or —$SO_2R$; n is 1 or 2; R, $R_2$ and $R_3$ are independently phenyl or alkyl, $R_4$ and $R_5$ are independently alkyl or together $R_4$ and $R_5$ are cycloalkyl, which functions as a non linear optical chromophore and a charge transfer agent, and (iii) about 43 weight % of nonphotoconductive polymer;
(b) means for applying an external electric field to the article;
(c) means for forming two intersecting beams of coherent electromagnetic radiation in the article; and
(d) means for impressing spatial information on one of the beams of radiation.

14. A holographic storage device comprising:
(a) a three-component photorefractive article for the transmission of electromagnetic radiation consisting essentially of (I) about 2 weight % of a sensitizer, (ii) about 50 weight % of a compound having the structure:

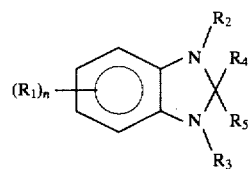

wherein $R_1$ is —$NO_2$, —CN, —$CHC(CN)_2$, —COR, —$CO_2R$ or —$SO_2R$; n is 1 or 2; R, $R_2$ and $R_3$ are independently phenyl or alkyl, $R_4$ and $R_5$ are independently alkyl or together $R_4$ and $R_5$ are cycloalkyl, which functions as a non linear optical chromophore and a charge transfer agent, and (iii) about 48 weight % of nonphotoconductive polymer;
(b) means for applying an external electric field to the article;
(c) means for forming two intersecting beams of coherent electromagnetic radiation in the article; and
(d) means for impressing spatial information on one of the beams of radiation.

15. A holographic storage device comprising:
(a) a three-component photorefractive article for the transmission of electromagnetic radiation consisting essentially of (I) about 2 weight % of a sensitizer, (ii) about 45 weight % of a compound having the structure:

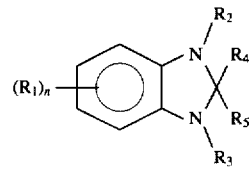

wherein $R_1$ is —$NO_2$, —CN, —$CHC(CN)_2$, —COR, —$CO_2R$ or —$SO_2R$; n is 1 or 2; R, $R_2$ and $R_3$ are independently phenyl or alkyl, $R_4$ and $R_5$ are independently alkyl or together $R_4$ and $R_5$ are cycloalkyl, which functions as a non linear optical chromophore and a charge transfer agent, and (iii) and about 53 weight % of nonphotoconductive polymer;

(b) means for applying an external electric field to the article;

(c) means for forming two intersecting beams of coherent electromagnetic radiation in the article; and (d) means for impressing spatial information on one of the beams of radiation.

16. A holographic storage device comprising:

(a) a three-component photorefractive article for the transmission of electromagnetic radiation consisting essentially of (I) about 2 weight % of a sensitizer, (ii) about 40 weight % of a compound having the structure:

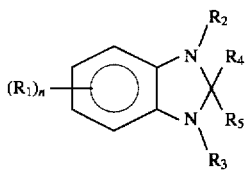

wherein $R_1$ is $-NO_2$, $-CN$, $-CHC(CN)_2$, $-COR$, $-CO_2R$ or $-SO_2R$; n is 1 or 2; R, $R_2$ and $R_3$ are independently phenyl or alkyl, $R_4$ and $R_5$ are independently alkyl or together $R_4$ and $R_5$ are cycloalkyl, which functions as a non linear optical chromophore and a charge transfer agent, and (iii) about 58 weight % of nonphotoconductive polymer;

(b) means for applying an external electric field to the article;

(c) means for forming two intersecting beams of coherent electromagnetic radiation in the article; and (d) means for impressing spatial information on one of the beams of radiation.

* * * * *